United States Patent
Park et al.

(10) Patent No.: US 10,337,466 B2
(45) Date of Patent: Jul. 2, 2019

(54) ENGINE SYSTEM OF VEHICLE

(71) Applicant: Hyundai Motor Company, Seoul (KR)

(72) Inventors: Jungjoo Park, Gyeonggi-do (KR); Min Sub Kim, Incheon (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/267,779

(22) Filed: Sep. 16, 2016

(65) Prior Publication Data

US 2017/0314514 A1 Nov. 2, 2017

(30) Foreign Application Priority Data

Apr. 28, 2016 (KR) .................. 10-2016-0052106

(51) Int. Cl.
| | |
|---|---|
| *F02M 35/10* | (2006.01) |
| *F02B 29/04* | (2006.01) |
| *F02M 26/04* | (2016.01) |
| *F02M 26/51* | (2016.01) |
| *F02B 33/40* | (2006.01) |

(52) U.S. Cl.
CPC ......... *F02M 26/04* (2016.02); *F02B 29/0406* (2013.01); *F02B 33/40* (2013.01); *F02M 26/51* (2016.02); *F02M 35/10157* (2013.01)

(58) Field of Classification Search
CPC .. F02M 35/10157; F02M 26/04; F02M 26/22; F02M 26/25; F02M 26/26; F02M 26/28; F02M 26/51; F02B 33/40; F02B 29/0406
USPC ..................................... 60/605.2; 123/568.12
See application file for complete search history.

(56) References Cited

U.S. PATENT DOCUMENTS

| | | | |
|---|---|---|---|
| 7,490,466 B2 * | 2/2009 | Robel | ............... F01N 3/035 60/274 |
| 2011/0094486 A1 * | 4/2011 | Vuk | ............ F01N 5/04 123/568.21 |

FOREIGN PATENT DOCUMENTS

| | | |
|---|---|---|
| JP | 2014-020246 A | 2/2014 |
| JP | 2014/034959 | 2/2014 |
| JP | 2015-083825 A | 4/2015 |
| JP | 2015/101972 | 6/2015 |
| KR | 10-1999-0059912 A | 7/1999 |

(Continued)

*Primary Examiner* — Patrick D Maines
*Assistant Examiner* — Dapinder Singh
(74) *Attorney, Agent, or Firm* — Brinks Gilson & Lione

(57) ABSTRACT

The present disclosure provides an engine system of a vehicle including an engine having combustion chambers for generating driving torque by burning fuel; an intake line in which fresh air flowing into the combustion chambers flows; an exhaust line in which exhaust gas exhausted from the combustion chambers flows; a recirculation line connecting the exhaust line and the intake line; a turbocharger including a turbine disposed at the exhaust line and rotated by the exhaust gas from the combustion chambers, and a compressor disposed at the intake line and rotated together with the turbine and compressing fresh air; an exhaust gas recirculation valve disposed at the connection of the recirculation line and the intake line to adjust an exhaust gas recirculation gas amount supplied to the intake line through the recirculation line; and a remaining gas elimination apparatus for supplying gas remaining in the intake line to the recirculation line.

3 Claims, 2 Drawing Sheets

(56) References Cited

FOREIGN PATENT DOCUMENTS

Figure 1:
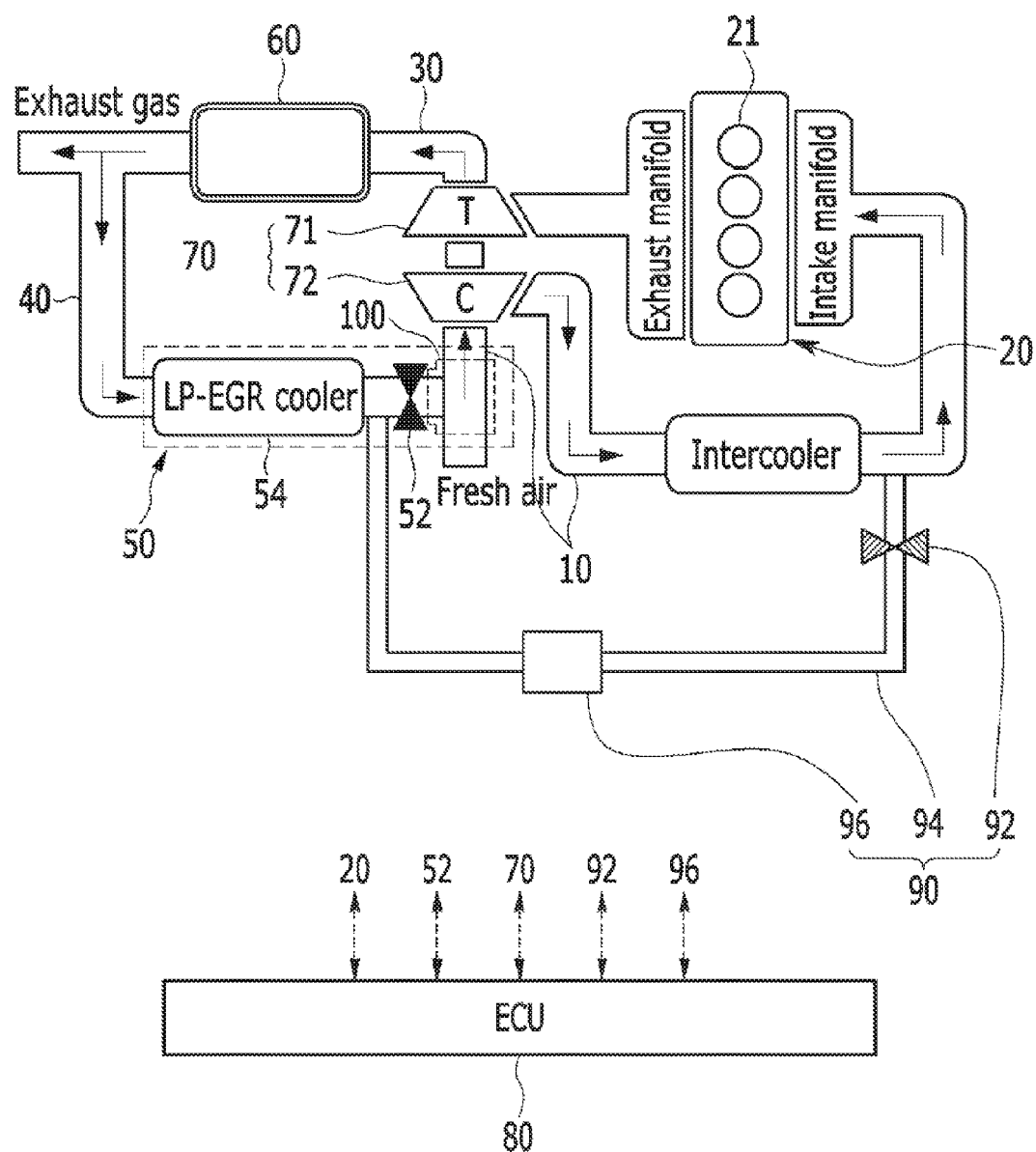

KR 10-2004-0043329 A 5/2004
KR 10-2015-0004939 A 1/2015

* cited by examiner

ENGINE SYSTEM OF VEHICLE

CROSS-REFERENCE TO RELATED APPLICATION

This application claims priority to and the benefit of Korean Patent Application No. 10-2016-0052106, filed on Apr. 28, 2016, the entire contents of which are incorporated herein by reference.

FIELD

The present disclosure relates to an engine system of a vehicle. More particularly, the present invention relates to an engine system including an exhaust gas recirculation apparatus.

BACKGROUND

The statements in this section merely provide background information related to the present disclosure and may not constitute prior art.

Generally, nitrogen oxide (NOx) included in exhaust gas is a cause of acid rain, harms eyes and the respiratory organs, and withers plants. NOx is regulated as a major air pollutant and research has been carried out in order to reduce the amount of NOx in exhaust gases.

An exhaust gas recirculation (EGR) system mounted in a vehicle reduces noxious exhaust gases of the vehicle. Generally, the amount of NOx in the exhaust gas is increased in an oxygen rich air mixture, and the air mixture is combusted well. Therefore, the exhaust gas recirculation system reduces the amount of NOx in the exhaust gas as a consequence of a part (e.g., approximately 5-20%) of the exhaust gas being recirculated to the air mixture in order to reduce the oxygen ratio in the air mixture and so hinder combustion.

Generally, an exhaust gas recirculation system includes a hot EGR system that reduces the amounts of NOx, particulate material (PM), and hydrocarbon (HO) exhausted by retarding an ignition and reducing an air/fuel ratio, and a cooled EGR system that lowers a temperature of a combustion chamber and hinders combustion by cooling a recirculated exhaust gas.

An EGR ratio means a ratio of an EGR gas amount supplied to the engine through an exhaust gas recirculation system in an entire air amount (fresh air+EGR gas) supplied to the engine. When the EGR ratio is increased, the oxygen amount supplied to a combustion chamber is decreased, combustion temperature is decreased, and nitrogen oxide is decreased. But when the EGR gas amount is excessively increased, engine output and fuel consumption are deteriorated. However, when the EGR ratio is decreased, the oxygen amount supplied to a combustion chamber is increased, combustion temperature is increased, and nitrogen oxide is increased. Therefore, it is desirable to control the EGR gas amount.

Further, we have found that some EGR gas remains in an intake line in which fresh air and the EGR gas flow after the engine is turned off. The remaining EGR gas flows into a combustion chamber of the engine when the engine is turned on, which can result in an abnormal combustion, such as a knocking and pre-ignition.

The above information disclosed in this Background section is only for enhancement of understanding of the background of the disclosure and therefore it may contain information that does not form the prior art that is already known to a person of ordinary skill in the art.

Further areas of applicability will become apparent from the description provided herein. It should be understood that the description and specific examples are intended for purposes of illustration only and are not intended to limit the scope of the present disclosure.

SUMMARY

The present disclosure provides an engine system of a vehicle that can remove a gas remaining in an intake line after an engine is turned off.

Further, the present disclosure provides an engine system of a vehicle that can prevent or reduce abnormal combustions and control an exact EGR ratio by removing the gas remaining in the intake line.

An engine system of a vehicle according to one form of the present disclosure may include an engine including a plurality of combustion chambers generating driving torque by burning fuel; an intake line into which fresh air flowing into the combustion chamber flows; an exhaust line in which exhaust gas exhausted from the combustion chambers flows; a recirculation line branched from the exhaust line and joined to the intake line; a turbocharger including a turbine disposed at the exhaust line and rotated by the exhaust gas exhausted from the combustion chambers, and a compressor disposed at the intake line and rotated together with the turbine and compressing fresh air; an EGR valve disposed at a portion where the recirculation line and the intake line are connected to adjust an EGR gas amount supplied to the intake line through the recirculation line; and a remaining gas elimination apparatus for supplying remaining in the intake line to the recirculation line.

The remaining gas elimination apparatus may include a remaining gas recollection line branched from the intake line and joined to the recirculation line; a remaining gas recollection valve disposed in the remaining gas recollection line and selectively opened; and a remaining gas recollection pump disposed in the remaining gas recollection line and pumping a remaining gas in the intake line to the remaining gas recollection line.

The remaining gas recollection line may be branched from the intake line between an intercooler and an intake manifold, and joined to the recirculation line between the EGR cooler and the EGR valve.

The remaining gas recollection valve may be opened for a predetermined time during an after run period or before the engine is started.

The remaining gas recollection pump may be operated for a predetermined time during an after run period or before the engine is started.

The after run period may be a period that the engine maintains idle state for a predetermined time after the engine is turned off.

According to one form of the present disclosure, a gas remaining in an intake line is removed by a remaining gas elimination apparatus after an engine is turned off, and thus it is possible to prevent or reduce abnormal combustions and control an EGR ratio exactly.

Further areas of applicability will become apparent from the description provided herein. It should be understood that the description and specific examples are intended for purposes of illustration only and are not intended to limit the scope of the present disclosure.

DRAWINGS

Figure 2:
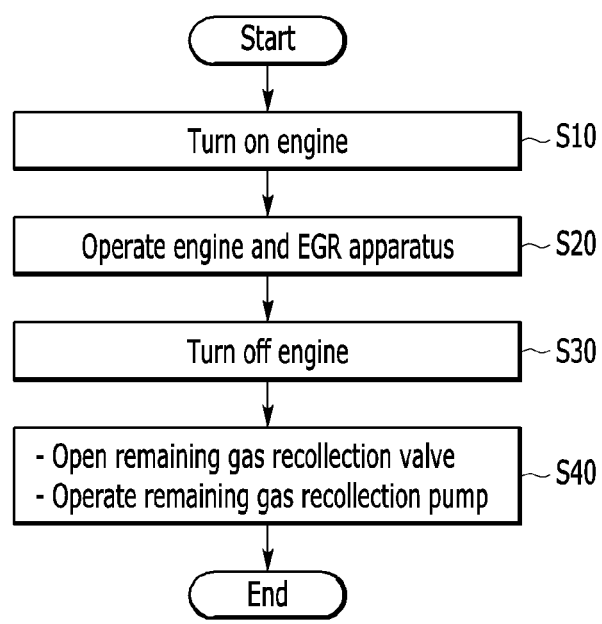

In order that the disclosure may be well understood, there will now be described various forms thereof, given by way of example, reference being made to the accompanying drawings, in which:

FIG. 1 is a schematic view illustrating an engine system of a vehicle according to one form of the present disclosure; and FIG. 2 is a flowchart explaining an operation of an engine system of a vehicle according to one form of the present disclosure.

The drawings described herein are for illustration purposes only and are not intended to limit the scope of the present disclosure in any way.

DESCRIPTION OF SYMBOLS

10: intake line
20: engine
21: combustion chamber
30: exhaust line
40: recirculation line
52: EGR valve
54: EGR cooler
70: turbocharger
71: turbine
73: compressor
80: ECU
90: remaining gas elimination apparatus
92: remaining gas recollection line
94: remaining gas recollection valve
96: remaining gas recollection pump

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

In order to clearly describe the present disclosure, portions that are not connected with the description will be omitted. Like reference numerals designate like elements throughout the specification.

In addition, the size and thickness of each configuration shown in the drawings are arbitrarily shown for better understanding and ease of description, but the present disclosure is not limited thereto. In the drawings, the thickness of layers, films, panels, regions, etc., are exaggerated for clarity.

FIG. 1 is a schematic view illustrating an engine system of a vehicle according to one form of the present disclosure.

As shown in FIG. 1, the engine system of the vehicle includes an engine 20 including a plurality of combustion chambers 21 generating driving torque by burning fuel, an intake line 10 into which fresh air flowing into the combustion chamber 21 flows, an exhaust line 30 in which exhaust gas exhausted from the combustion chambers 21 flows, and a recirculation line 40 line branched from the exhaust line 30 and joined to the intake line 10.

A connection pipe 100 is disposed at a portion where the recirculation line 40 and the intake line 10 are connected.

Various exhaust gas purification apparatus 60 that purify exhaust gas exhausted from the combustion cylinders 21 are disposed at the exhaust line 30. The exhaust gas purification apparatus 60 may include an LNT (lean NOx trap), a DOC (diesel oxidation catalyst), and a DPF (diesel particulate filter).

The engine system includes an exhaust gas recirculation (EGR) apparatus in which a part of the exhaust gas exhausted from the combustion chamber 21 is resupplied to the combustion chamber 21.

The EGR apparatus includes a recirculation line 40 branched at the exhaust line 30 and joined at the intake line 10, an EGR cooler 54 disposed at the recirculation line 40, and an EGR valve 52 disposed at the recirculation line 40. The EGR cooler 54 cools exhaust gas (hereinafter, will be referred to as a 'EGR gas') recirculated through the recirculation line 40. The amount of gas recirculated is adjusted by the EGR valve 52.

The engine system includes a turbocharger 70 that compresses the fresh air (or external air) flowing in through the intake line 10 and the EGR gas flowing in through the recirculation line 40 and supplies the compressed air to the combustion chambers 21. The turbocharger 70 includes turbine 71 disposed at the exhaust line 30 and rotated by the exhaust gas exhausted from the combustion chambers 21, and a compressor 72 disposed at the intake line 10 and compressing fresh air and EGR gas by being rotated together with the turbine 71.

The turbine 71 includes a turbine housing, and a turbine wheel disposed in the turbine housing and rotated by rotation force of exhaust gas exhausted from the combustion cylinders 21. The compressor 72 includes a compressor housing, and a compressor wheel disposed in the compressor housing and rotated together with the turbine wheel. Fresh air and recirculation gas are compressed by rotation of the compressor wheel of the compressor 72, and the compressed gas is supplied to the combustion chambers 21.

The engine system according to one form of the present disclosure includes a remaining gas elimination apparatus 90 for supplying a remaining gas remaining in the intake line 10 to the recirculation line 40.

The remaining gas elimination apparatus 90 includes a remaining gas recollection line 94 branched from the intake line 10 and joined to the recirculation line 40, a remaining gas recollection valve 92 disposed in the remaining gas recollection line 94 and selectively opened, and a remaining gas recollection pump 96 disposed in the remaining gas recollection line 94 and pumping a remaining gas in the intake line 10 to the remaining gas recollection line 40.

The remaining gas recollection line 94 is branched from the intake line 10 between an intercooler and an intake manifold, and joined to the recirculation line 40 between the EGR cooler 54 and the EGR valve 52.

The remaining gas recollection valve 92 may be closed while the engine is normally operated after the engine is on, and may be opened for a predetermined time (e.g., approximately 3-5 seconds) during an after-run period.

Alternatively, the remaining gas recollection valve 92 may be opened before the engine is on for a predetermined time. For example, when a driver having a remote control key boards the vehicle, an ECU (engine control unit) detects that the driver boards the vehicle through wireless communication between the remote control key and the ECU and controls the remaining gas recollection valve 92 to be opened for a predetermined time before the engine is turned on.

The remaining gas recollection pump 96 may not be operated while the engine is normally operated after the engine is on, and may be operated for a predetermined time (e.g., approximately 3-5 seconds) during an after-run period. Alternatively, the remaining gas recollection pump 96 may be operated before the engine is on for a predetermined time. For example, when a driver having a remote control key boards the vehicle, an ECU (engine control unit) detects that the driver boards the vehicle through wireless communication between the remote control key and the ECU and controls the remaining gas recollection pump 96 to be operated for a predetermined time before the engine is turned on.

That is, when the remaining gas recollection pump 96 is operated during the after-run period or before the engine is on, the EGR gas and the fresh air flowing in the intake line 10 are pumped from the intake line 10 to the recirculation line 40 through the remaining gas recollection line 94 by the remaining gas recollection pump 96.

An operation of the engine, opening and closing of the remaining gas recollection valve 92, an operation of the remaining gas recollection pump 96, an operation of the turbocharger, and an operation of the exhaust gas recirculation apparatus may be controlled by a control signal of the ECU (engine control unit) 80.

The ECU 80 may be implemented with one or more microprocessors operated by a predetermined program or hardware including the microprocessor, and the predetermined program includes a series of commands for performing the method for controlling the engine system according to one form of the present disclosure to be described.

The after run period may mean a period that the engine maintains idle state for a predetermined time after the engine is turned off.

FIG. 2 is a flowchart explaining an operation of an engine system of a vehicle according to one form of the present disclosure.

Referring to FIG. 2, when the engine is on at step S10, fresh air and fuel are supplied to the engine through the intake line 10, and driving torque is generated in the combustion chambers 21 of the engine 20 by burning fuel at step S20.

A part of the exhaust gas generated at the combustion chambers 21 of the engine 20 is resupplied to the combustion chambers 21 through the recirculation line 40 and the intake line 10 by an operation of the EGR apparatus 50 at step S20. The EGR gas amount may be adjusted by an opening and closing of the EGR valve 52.

When the engine is turned off, the EGR gas remains in the intake line 10. The EGR gas that remains in the intake line 10 will be referred as a remaining gas.

When the engine is turned off at step S30, the remaining gas recollection valve 92 is opened by the ECU 80 for a predetermined time (e.g., approximately 3-5 seconds) and the remaining gas recollection pump 96 is operated by the ECU 80 for a predetermined time (e.g., approximately 3-5 seconds) during the after run period at step S40.

The remaining gas in the intake line 10 is pumped to the recirculation line 40 through the remaining gas recollection line 94 by an operation of the remaining gas recollection pump 96. Therefore, the remaining gas in the intake line 10 flows into the recirculation line 40 after the engine is turned off.

And when the engine is turned on and the EGR apparatus 50 is operated, the remaining gas supplied to the recirculation line 40 and the fresh air are supplied to the combustion chambers 21 of the engine 20.

As described above, according to one form of the present disclosure, the remaining gas in the intake line 10 is pumped to the recirculation line 40 by the opening of the remaining gas recollection valve 92 and the operation of the remaining gas recollection pump 96, and thus the remaining gas does not remained in the intake line 10.

Therefore, when the engine is turned on after the engine has been turned off, it is possible to prevent or reduce abnormal combustion (e.g., knocking or pre-ignition, etc.) by the remaining gas in the intake line 10.

Further, when the EGR apparatus 50 is operated, the EGR gas amount supplied to the combustion chamber can be exactly adjusted.

While this disclosure has been described in connection with what is presently considered to be practical forms, it is to be understood that the disclosure is not limited to the disclosed forms, but, on the contrary, is intended to cover various modifications and equivalent arrangements included within the spirit and scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An engine system of a vehicle comprising:
   an engine including a plurality of combustion chambers for generating a driving torque by burning a fuel;
   an intake line in which a fresh air flowing into the combustion chambers flows;
   an exhaust line in which an exhaust gas exhausted from the combustion chambers flows;
   a recirculation line branched from the exhaust line and joined to the intake line;
   a turbocharger including a turbine disposed at the exhaust line and rotated by the exhaust gas exhausted from the combustion chambers, and a compressor disposed at the intake line and rotated together with the turbine to and configured to compress the fresh air;
   an exhaust gas recirculation (EGR) valve disposed at a portion where the recirculation line and the intake line are connected to adjust an exhaust gas recirculation (EGR) gas amount supplied to the intake line through the recirculation line; and
   a remaining gas elimination apparatus for supplying a remaining gas remaining in the intake line to the recirculation line,
   wherein the remaining gas elimination apparatus includes:
   a remaining gas recollection line branched from the intake line and joined to the recirculation line;
   a remaining gas recollection valve disposed in the remaining gas recollection line to be selectively opened;
   a remaining gas recollection pump disposed in the remaining gas recollection line to pump the remaining gas in the intake line to the remaining gas recollection line; and
   a controller for controlling an operation of the engine, an operation of the remaining gas recollection valve, and an operation of the remaining gas recollection pump,
   wherein the controller controls the remaining gas recollection valve to be opened and the remaining gas recollection pump to be operated for a predetermined time during at least one of an after run period and before the engine is started.

2. The engine system of claim 1, wherein
   the remaining gas recollection line
   is branched from the intake line between an intercooler and an intake manifold, and joined to the recirculation line between an exhaust gas recirculation (EGR) cooler and the EGR valve.

3. The engine system of claim 1, wherein the after run period is a period that the engine maintains an idle state for a predetermined time after the engine is turned off.

* * * * *